Jan. 25, 1938.   P. McK. DEELEY   2,106,208
ELECTROLYTIC DEVICE
Filed Dec. 30, 1935
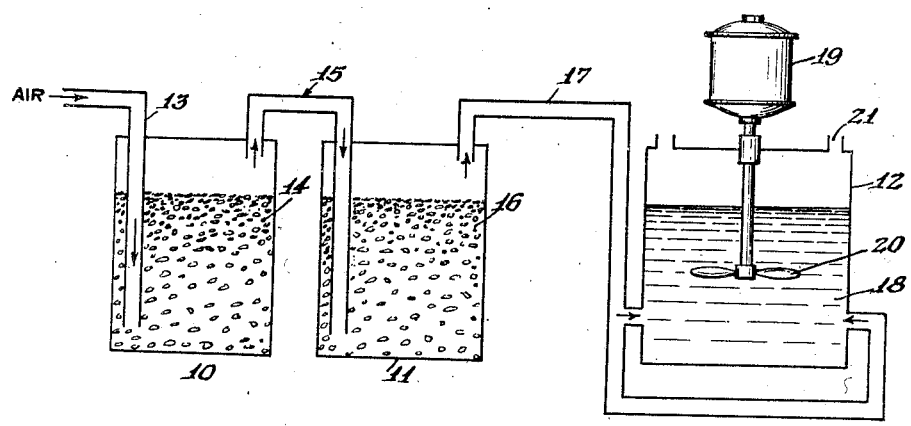
INVENTOR.
Paul McKnight Deeley
BY
ATTORNEY.

Patented Jan. 25, 1938

2,106,208

UNITED STATES PATENT OFFICE 2,106,208

ELECTROLYTIC DEVICE

Paul McKnight Deeley, New York, N. Y., assignor to Cornell-Dubilier Corporation, New York, N. Y., a corporation of New York Application December 30, 1935, Serial No. 56,595

11 Claims. (Cl. 175—315)

This invention relates to electrolytic devices, more particularly to electrolytic condensers which depend for their action on the properties of the dielectric or oxide film which may be deposited electrolytically upon the surface of the so-called film forming metal electrodes, in particular aluminum when immersed in a suitable electrolyte and subjected to an electric forming current.

The invention has a particular reference to a new and improved electrolyte and a method for preparing the same suited for forming a dielectric film upon the condenser electrodes before their assembly into the condenser unit or after the assembly of the condenser as well as to serve as a conducting medium to and from the electrodes in the finished condenser unit.

Film forming electrolytes, in particular for use in connection with aluminum electrodes, usually comprise a solution of a weak acid such as boric acid or any other well known type of acid, a salt of a weak acid or ammonia and a polyhydroxyl alcohol such as ethylene glycol to which may be added a further ingredient to secure a thick or pasty consistency of the electrolyte such as gum arabic or gum tragacanth. The aforementioned or any other suitable ingredients are usually mixed so as to react chemically either with or without the application of heat in such a manner as to produce an electrolyte solution of desired properties, such as a glycol borate as in the above example.

During the mixing of the electrolyte the ingredients, usually a substantial amount of excess water is formed by the chemical reaction taking place which makes it necessary to heat the electrolyte to considerable temperatures in order to evaporate the undesired water content.

The object of the present invention is to provide a novel method for preparing an electrolyte of the above general characteristics and for removing the excess water content originally resulting from the chemical reaction between the electrolyte ingredients.

A further disadvantage of preparing electrolytes in the above described manner is the fact that due to the heating or boiling of the solution, not only excess water but also the ingredients of the electrolytes such as ethylene glycol, boric acid, ammonia, and gum tragacanth in the example above given will be partly driven off, resulting in a substantial waste and loss of these materials and consequent increased cost of the condenser.

Accordingly it is a further object of the invention to provide an improved method of preparing an electrolyte solution especially suited for electrolytic condensers which is free from the aforementioned deficiencies and by which excess water is removed from the electrolyte solution without substantial loss and waste of the ingredients of the electrolyte.

Another disadvantage incident to known methods of preparing an electrolyte solution is the fact that by the application of considerable heat or by boiling the electrolyte, the chemical nature or formula of the electrolyte may be altered, resulting in an inferior electrolyte and a condenser of inferior quality.

Accordingly it is another object of the invention to provide an improved method of preparing an electrolyte solution especially suited for electrolytic condensers by which excess water or other undesired constituents of the electrolyte may be removed without substantially altering the chemical composition of the electrolyte.

A further object of the invention is to provide an improved method of preparing an electrolyte especially suited for electrolytic condensers by which excess water or other undesired substances are removed from the electrolyte solution without causing any chemical change or decomposition of any of the ingredients of the electrolyte.

Another known disadvantage of electrolytes prepared in accordance with the usual methods employing heating or boiling during the mixing of the electrolyte ingredients is caused by the fact that the electrolyte has to be handled in a hot condition and has to be incorporated immediately in the condenser structure.

It is therefore a further object of the invention to provide a novel method of preparing an electrolyte for electrolytic condensers by which a substantial heating or boiling of the electrolyte ingredients is avoided and an electrolyte is obtained which need not be used immediately and which can be stored for future use.

Further objects and aspects of the invention will become more apparent from the following description of a practical method of preparing an electrolyte in accordance with the invention taken with reference to the accompanying drawing illustrating one method of carrying out the invention.

The electrolyte prepared according to the method to be described presently is suited for use both in electrolytic condensers and other electrolytic devices such as rectifiers and is equally suited for use in condensers intended for operation at voltages from about 6 to above 500 volts.

In its preferred form, the electrolyte and method of preparing the same in accordance with the improvement of the present invention especially for electrolytic condensers employing aluminum as anode metal consists substantially of a mixture of a polyhydric alcohol, such as glycerine or a glycol, boric acid and a salt of boric acid, or ammonium hydroxide. The mixture is preferably prepared in the following proportions:

| | Grams |
|---|---|
| Ethylene glycol | 840 |
| Boric acid | 1000 |
| Ammonium hydroxide 26° Baumé | 119 |

This electrolyte is prepared by stirring the ammonium hydroxide into the boric acid and then stirring the ethylene glycol into the mixture. The mixture is then stirred or moved while a stream of pre-dried air or any other suitable drying medium is passed over or through the mixture for the purpose of removing a certain amount of moisture content in the mixture produced during the chemical reaction between the separate ingredients. This agitation and passage of pre-dried air is continued until the original weight of the mixture has been reduced approximately 25%. The stream of pre-dried air is then stopped and gum tragacanth is added and thoroughly stirred into the mixture. As will be understood, any suitable means may be used for producing an air stream, such as a blower driven by an electric motor, the air if necessary being passed through a heating device to remove any excess moisture before being applied to the electrolyte solution.

As will be understood, it is not necessary that the air passed over or through the electrolyte mixture be heated, it being only essential that the air or any other drying medium be sufficiently dry or have a sufficiently low humidity content so as to cause rapid removal of the excess water or other undesired medium in the electrolyte by evaporation.

The electrolyte is then ready for use in electrolytic cells or condensers. Preferably small quantities of water may be added with the gum tragacanth if the electrolyte is to be used in cells intended for service in condensers at voltages lower than 600 volts.

Referring to the drawing, this illustrates diagrammatically one method of practicing the invention as described. The air which may be supplied by a pump or other device is passed in succession through a pair of pre-drying tanks shown at 10 and 11 containing silica gel or similar moisture absorbing material before being passed through the electrolyte mixture 18 in the third tank shown at 12. In the example shown, the air is first passed through a pipe 13 and the absorbing material 14 in the tank 10 and then through a second pipe shown at 15 connecting the tank 10 with the next tank 11. After passing the absorbing material 16 in the latter tank and efficient moisture removal the air stream is then passed into the electrolyte mixture 18 through a pipe 17 connecting the tank 11 with the electrolyte tank 12. During this process the electrolyte mixture is agitated by means of a suitable stirring device such as a propeller 20 driven by an electromotor 19 as illustrated. After the electrolyte has been prepared in this manner it may be drawn off through an outlet shown at 21 for use in an electrolytic device as described hereinbefore. Instead of passing the drying air stream through the electrolyte mixture, it may also be passed over the mixture as described hereinbefore, by proper arrangement of the inlet of the pipe 17 to the tank 12 as will be understood.

It is evident from the above that the invention is not limited to the specific example of an electrolyte composition chosen for illustration, but equally applies to the preparing of solutions made with different ingredients wherein excess water or any other undesirable medium is to be removed without excessive application of heat likely to affect the chemical composition of the electrolyte or its ingredients or to result in loss and waste of appreciable amounts of the electrolyte constituents.

I claim:

1. The method of preparing electrolytes for use in electrolytic condensers or the like which consists in reacting together a weak acid and polyhydroxyl alcohol and controlling the water content of the reaction product by removing excess reaction water by subjecting the electrolyte mixture to a dry air stream.

2. The method of preparing electrolytes for use in electrolytic condensers or the like which consists in reacting together a weak acid, a salt of a weak acid and polyhydroxyl alcohol in predetermined proportions, and controlling the water content of the reaction product by simultaneously removing excess reaction water by subjecting the electrolyte mixture to the action to a dry air stream until the weight of the mixture is reduced about 25%.

3. The method of preparing electrolytes for use in electrolytic condensers or the like which consists in reacting together a weak acid, ammonia and polyhydroxyl alcohol in predetermined proportions and controlling the water content of the reaction product by simultaneously removing excess reaction water by subjecting the electrolyte mixture to a dry air stream until its weight is reduced about 25%.

4. The method of preparing electrolytes for use in electrolytic condensers or the like which consists in reacting together boric acid, ammonium hydroxide and ethylene glycol in predetermined proportions and controlling the water content of the reaction product by simultaneously removing excess reaction water from the electrolyte mixture by subjecting the same to the action of a stream of dry air until its weight is reduced about 25%.

5. The method of preparing electrolytes for use in electrolytic condensers or the like which consists in reacting together a weak acid, a salt of a weak acid and polyhydroxyl alcohol and controlling the water content of the reaction product by removing excess reaction water from the electrolyte mixture by simultaneously passing over it a stream of dry air.

6. The method of preparing electrolytes for use in electrolytic condensers or the like which consists in reacting together a weak acid, a salt of a weak acid and polyhydroxyl alcohol and controlling the water content of the reaction product by removing excess reaction water from the electrolyte mixture by simultaneously passing through it a stream of dry air.

7. The method of preparing an electrolyte for use in electrolytic condensers and the like, which consists in reacting together an ionogen substance with a polyhydric alcohol, and controlling the water content of the reaction product formed by continuously subjecting the electrolyte mixture during the reaction to the action of a gaseous dehydrating medium, thereby to remove excess reaction water immediately upon being formed and to maintain the water content during the reaction and in the end product at a predetermined value.

8. The method of preparing an electrolyte for use in electrolytic condensers and the like, which consists in reacting together an ionogen substance with a polyhydric alcohol, and controlling the water content of the reaction product formed by continuously subjecting the electrolyte mixture during the reaction to the action of a dehydrating air stream, thereby to remove reaction water immediately upon being formed and to maintain the water content during the reaction and in the end product at a predetermined value.

9. The method of preparing an electrolyte for use in electrolytic condensers or the like, which consists in reacting together an ionogen substance with a polyhydric alcohol and controlling the water content of the reaction product formed by continuously passing a dehydrating air stream over the electrolyte mixture during the reaction, thereby to remove a definite amount of reaction water immediately upon being formed and to maintain the water content of the electrolyte mixture during the reaction and in the final product at a predetermined value.

10. The method of preparing an electrolyte for use in electrolytic condensers or the like, which consists in reacting together an ionogen substance with a polyhydric alcohol, and controlling the water content of the reaction product formed by continuously passing a dehydrating air stream through the electrolyte mixture during the reaction period, thereby to remove a predetermined amount of reaction water immediately upon being formed and to maintain the water content of the mixture during the reaction and in the final product at a predetermined value.

11. The method of preparing an electrolyte for use in electrolytic condensers and the like, which consists in reacting together an ionogen substance with an organic solvent, and controlling the water content of the reaction product formed by continuously subjecting the electrolyte mixture during the reaction to the action of a dehydrating air stream, thereby to remove excess reaction water immediately upon being formed and to maintain the water content of the electrolyte during the reaction and in the final product at a predetermined value.

PAUL McKNIGHT DEELEY.